United States Patent
Taratine et al.

(10) Patent No.: US 9,830,447 B2
(45) Date of Patent: *Nov. 28, 2017

(54) METHOD AND SYSTEM FOR VERIFYING AN ACCESS REQUEST

(71) Applicant: VISA EUROPE LIMITED, London (GB)

(72) Inventors: Boris Taratine, London (GB); Matthew Johnson, Bedfordshire (GB); Simon Peter Rust, Berkshire (GB); Andrew Warren Rounds, Gloucestershire (GB)

(73) Assignee: VISA EUROPE LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,857

(22) Filed: Mar. 5, 2015

(65) Prior Publication Data

US 2015/0178494 A1 Jun. 25, 2015

Related U.S. Application Data

(63) Continuation of application No. PCT/GB2013/052347, filed on Sep. 6, 2013.

(30) Foreign Application Priority Data

Sep. 6, 2012 (GB) .................................. 1215951.3
Dec. 7, 2012 (GB) .................................. 1222090.1

(51) Int. Cl.
G06F 21/45 (2013.01)
H04L 29/06 (2006.01)
(Continued)

(52) U.S. Cl.
CPC .............. *G06F 21/45* (2013.01); *G06F 21/31* (2013.01); *G06F 21/34* (2013.01);
(Continued)

(58) Field of Classification Search
CPC ..................... G06F 21/30; G06F 21/31; G06F 21/34–21/35; G06F 21/45;
(Continued)

(56) References Cited

U.S. PATENT DOCUMENTS 4,720,860 A 1/1988 Weiss
4,998,279 A 3/1991 Weiss
(Continued)

FOREIGN PATENT DOCUMENTS

CN 1838595 A 9/2006
CN 101204067 A 6/2008
(Continued)

OTHER PUBLICATIONS

Nationwide, "Card Reader Security for Internet Banking." http://www.nationwide.co.uk/NR/rdonlyres/B5038E I5-4C77-48E8-9B83-302044 7DFB5E/O/rca _illustrator_access 1 v2.pdf.
(Continued)

*Primary Examiner* — Kevin Bechtel
(74) *Attorney, Agent, or Firm* — EIP US LLP

(57) ABSTRACT

Systems and methods for use in verifying a request for access to data in a system comprising a first module having access to a first trusted indicator of time, a second module having access to an untrusted indicator of time and a computing device having access to a second trusted indicator of time. The first module generates a password using at least the first trusted indicator of time. The second module receives a password associated with the request for access to data and validates the received password using at least the untrusted indicator of time. The second module then causes
(Continued)

a message to be transmitted to the computing device, the message comprising data indicative at least of the untrusted indicator of time used to validate the received password. The computing device then generates data indicative of a comparison between the untrusted indicator of time and the second trusted indicator of time, and uses the generated data to provide said access to data.

21 Claims, 3 Drawing Sheets

(51) Int. Cl.
    *G06F 21/34*     (2013.01)
    *G06F 21/72*     (2013.01)
    *G06Q 20/30*     (2012.01)
    *G06F 21/31*     (2013.01)
    *G06F 21/62*     (2013.01)

(52) U.S. Cl.
    CPC ........ *G06F 21/6245* (2013.01); *G06F 21/725* (2013.01); *G06Q 20/30* (2013.01); *H04L 63/083* (2013.01); *H04L 63/0846* (2013.01); *G06F 2221/2151* (2013.01)

(58) Field of Classification Search
    CPC ........ G06F 2221/2151; H04L 9/3226–9/3228; H04L 9/3234; H04L 9/0861–9/0863; H04L 63/08; H04L 63/083–63/0853; H04L 2463/082; H04W 12/06
    See application file for complete search history.

(56) References Cited

U.S. PATENT DOCUMENTS

| | | |
|---|---|---|
| 5,367,572 A | 11/1994 | Weiss |
| 8,627,419 B1 | 1/2014 | Vandemar |
| 8,806,600 B2 | 8/2014 | Taratine et al. |
| 2005/0005114 A1 | 1/2005 | Medvinsky |
| 2005/0138357 A1* | 6/2005 | Swenson ............... H04L 9/3263 713/155 |
| 2007/0250923 A1 | 10/2007 | M'Raihi |
| 2007/0266256 A1 | 11/2007 | Shah et al. |
| 2008/0022413 A1 | 1/2008 | Holtzman et al. |
| 2008/0168543 A1 | 7/2008 | von Krogh |
| 2009/0013390 A1 | 1/2009 | Li |
| 2009/0193264 A1 | 7/2009 | Fedronic et al. |
| 2009/0322766 A1* | 12/2009 | Marien ................. G06F 21/606 345/520 |
| 2010/0107229 A1* | 4/2010 | Najafi .................... G06F 21/35 726/6 |
| 2012/0084854 A1 | 4/2012 | Mualem et al. |
| 2012/0089519 A1* | 4/2012 | Peddada ............ G06Q 20/3829 705/71 |
| 2013/0340071 A1* | 12/2013 | Vellozo Luz .......... G06F 21/36 726/18 |

FOREIGN PATENT DOCUMENTS

| | | |
|---|---|---|
| CN | 102185838 A | 9/2011 |
| EP | 1139200 A3 | 10/2001 |
| EP | 2296311 A1 | 3/2011 |
| WO | 2006040820 A1 | 4/2006 |
| WO | 2010127945 A1 | 11/2010 |

OTHER PUBLICATIONS

Battlenet, "Battle.net Authenticator FAQ," Battle.net Support, Oct. 17, 2012. https ://us.battle.net/support/en/article/battle-net-authenticator-faq.

Fadi Aloul et al., "Two Factor Authentication Using Mobile Phones" Computer Systems and Applications, IEEE/ACS International Conference on IEEE, Piscataway, NJ, May 10, 2009.

International Search Report and Written Opinion issued in corresponding PCT Application No. PCT/GB2013/052346 dated Dec. 2, 2013.

International Search Report and Written Opinion issued in corresponding PCT Application No. PCT/GB2013/052347 dated Dec. 2, 2013.

* cited by examiner

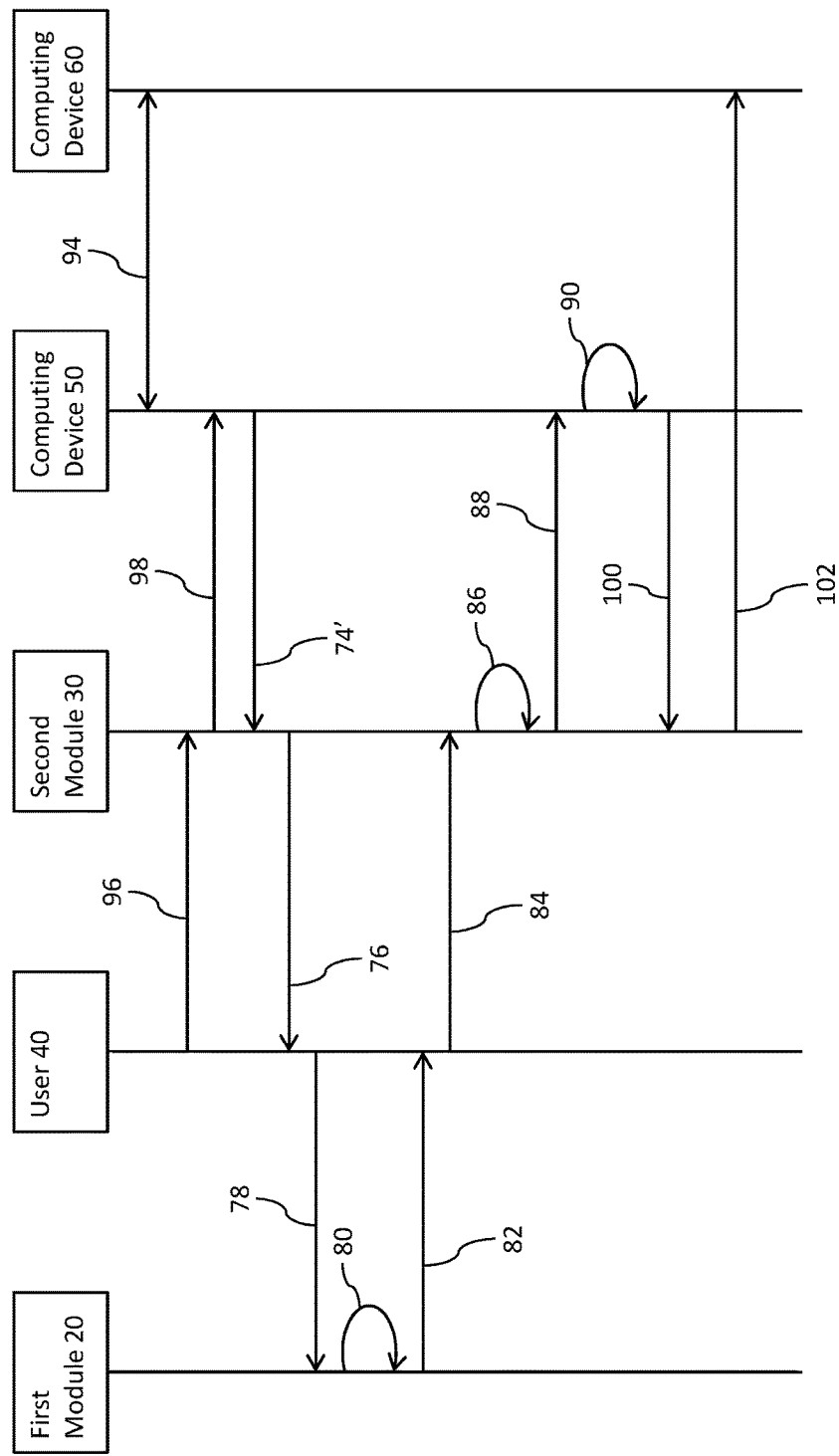

METHOD AND SYSTEM FOR VERIFYING AN ACCESS REQUEST

CROSS-REFERENCE TO RELATED APPLICATIONS

This application is a continuation of International Application No. PCT/GB2013/052347, filed Sep. 6, 2013, which claims the benefit of both UK Application No. GB 1215951.3, filed Sep. 6, 2012, and UK Application No. GB 1222090.1, filed Dec. 7, 2012. Each of the above-referenced patent applications is incorporated by reference in its entirety.

BACKGROUND OF THE INVENTION

Field of the Invention

The present invention relates to a method and system for verifying an access request, and is particularly, but not exclusively suitable for verifying a request for access to data, services or assets.

Description of the Related Technology

The demand for access to confidential or user-specific data (or assets or services) is increasing. For example, providing access to a bank account and allowing the transfer of money from that account should be restricted to authorized users such as an account holder. Typically users are authenticated when requesting access to data by means of credentials that identify the person requesting access to the data. Remote access of data presents particular problems because the person requesting data, assets or services is typically in a different physical location to that of the party responding to the request. As a result it is very difficult for the party servicing the request to know whether the entity making the request is a) who they claim to be, b) entitled to use the device from where the request originates and c) is in possession of the device from where the request originates.

Typically, when an account is set up between a person and a party such as a data provider, the person will establish the aforementioned credentials for use by the data provider in identifying and authenticating the person for future requests. Such credentials may include information that uniquely identifies the parson (e.g. personally identifiable information (PII)) and a secret (e.g. a password) for use in verifying the identity of the person. It is now also common that the data provider will require the person to register themselves as the owner of a device used to access the data. The registered association between the device and the owner of the device can be used by the data provider as an additional validation factor. For example, in the case that a data provider receives a request for access to an account on behalf of a particular person from a particular device that is not the device registered for the person, the data provider may determine to trust that the request was made by the person registered for the account.

It can be relatively easy for a person wishing to access data from a data provider on behalf of another person who has an account with that data provider to obtain his user credentials (i.e. PII, User ID and password) by purchasing them from criminal shadow online markets and thereafter fraudulently access the other person's data. Additionally, it is possible to remotely access and control devices, and thereby request data on behalf of the registered owner of those devices. Often it is not possible to determine whether the request was made by a user who is in physical possession of the device or whether the request was made remotely by a user using another device to remotely control the device from which the request is made.

One-time passwords (OTP) are commonly used to alleviate these issues: an authentication server uniquely assigns an OTP generation key to the registered owner of a device, the OTP generation key being for use in generating and validating OTPs. An authentication server typically holds hundreds or thousands of OTP generation keys, each having been uniquely assigned to, or registered in respect of, a different person. The authentication server configures an OTP token in the possession of the registered owner with his assigned OTP generation key. These OTP tokens may, for example, use the OTP generation key to generate a different password each time a new password is requested by the registered user or as another example, may use the OTP generation key to generate new passwords at regular time intervals. The OTP token may additionally use an indication of the current time to generate an OTP, to prevent the OTP being stored and replayed at a later time.

In order to access user-restricted data via a device, a user provides the OTP generated by the OTP token to the data provider along with the credentials that uniquely identify the owner of the device. Typically, the data provider will then identify the owner of the device and pass on the received OTP to the authentication server. The authentication server will look up the OTP generation key associated with the identified person and will use the key, and if required the current time, to determine whether the received OTP corresponds to the OTP that would have been generated by the OTP token held by the owner of the device at the current time, or at least within a predetermined period of the current time. The authentication server will then indicate to the data provider whether the received OTP is valid. If the correct OTP was sent to the data provider, then it can be determined that the user of the device is in possession of the OTP token. However, authentication servers are vulnerable to compromise thereby facilitating the unauthorized distribution to other entities and enabling anyone with (illegitimate) access to a distributed OTP generation key to access data on behalf of the person associated with that key.

SUMMARY

According to a first aspect of the present invention, there is provided a system for use in verifying a request for access to data, the system having access to a computing device that is configured to communicate with a first trusted indicator of time, the system comprising: a first module having access to a second trusted indicator of time; and a second module having access to an untrusted indicator of time, wherein: the first module is arranged to generate a password using at least the second trusted indicator of time; the second module is arranged to: receive a password associated with the request for access to data, validate the received password using at least the untrusted indicator of time; and cause a message to be transmitted to the computing device, the message comprising data indicative of the untrusted indicator of time used to validate the received password, and the system is arranged to cause the computing device to generate data indicative of a comparison between the untrusted indicator of time and the first trusted indicator of time, wherein the generated data is for use in providing said access to data.

In some situations a second module may not have access to a trusted indicator of time (without communicating with an external element). Accordingly, modifications to the untrusted time may open a system up to attack. By verifying a password using the untrusted indicator of time, and then causing a message to be transmitted to a computing device, where the untrusted time is compared to a trusted time, the possibility for attack is obviated. Moreover, the amount of signaling for verification is reduced, as only a single message may need to be sent from the second module to the computing device or system.

In one embodiment, the system is arranged to cause the computing device to selectively provision the system with said access to data on the basis of said generated data. In this embodiment, it is the computing device that facilitates access to the requested data.

Advantageously, the message transmitted to the computing device may comprise data indicative of the validation of the received password using at least the untrusted indicator of time by the second module.

In one arrangement, the first and second modules share a secret that has been uniquely assigned thereto, the first module being arranged to use the secret to generate the password, and the second module being arranged to use the secret to validate the received password. The shared secret may be stored in a secure element of the first module. Alternatively or additionally, the secret may be stored in a secure element of the second module. In other embodiments, the first and second modules do not share a secret for use in generating and validating passwords.

In one arrangement, the first module comprises tamper resistant hardware comprising a clock, the clock being arranged to provide the second trusted indicator of time.

In some arrangements, the second module may be communicatively connected to a device having a clock, the clock being arranged to provide the untrusted indicator of time.

Advantageously, in one arrangement, the system may be arranged to cause the computing device to send a message comprising the generated data to a further computing device whereby to provision the system with said access to data, and the further computing device may be arranged to provide said access to data upon receipt of the generated data.

Alternatively, in an arrangement where the requested data is stored at or generated by the computing device, the system may be arranged to cause the computing device to provide said access to data based on the generated data.

The first module may, in some arrangements, be arranged to receive, via an interface of the first module, a challenge code generated by the second module or the computing device, and to generate the password using at least the challenge code.

In some arrangements, the first module may be arranged to generate a plurality of passwords, at least one password of the plurality of passwords being different from another password of the plurality of passwords, and to provide at least one of the generated passwords to a user via an interface of the first module.

Advantageously, the second module and the computing device may share a further secret for use in communications therebetween.

In one arrangement, the second module may be arranged to store said received password, and to compare said received password to any previously stored received passwords whereby to validate the received password.

In an alternative embodiment of the present invention the second module may be arranged to receive said generated data from the computing device and use said received data to provide said access to data. This embodiment can be contrasted with embodiments in which the computing device is arranged to selectively provision the system with said access to data on the basis of said generated data in that, in this embodiment, it is the second module that facilitates access to the requested data, rather than the computing device.

In some arrangements the first and second modules may be communicatively disconnected. This has the advantage that the password generated by the first module cannot be remotely accessed via the second module. Thus, in order for a user to be able to correctly enter a password, which has been generated by the first module, into the second module, the user must have possession of the first module. In such arrangements, therefore, it can be determined whether the user has possession of the first module. This can be useful, for example, in determining whether the user of the first module is a human user.

In some arrangements, said data received from the computing device comprises data indicating whether the untrusted indicator of time is within a predetermined range of the first trusted indicator of time.

The requested data may, in some arrangements, be held by the second module, and the second module may be configured to use said data received from the computing device to determine whether to provide access to said requested data.

The second trusted indicator of time may be a clock of the first module, and the first trusted indicator of time may be a clock that is synchronized with the clock of the first module.

Advantageously, the computing device and the second module may be preconfigured with cryptographic keys for use in signing data sent therebetween, and the second module may be arranged to sign said message transmitted to the computing device and to verify that said data received from the computing device is signed by the computing device using said cryptographic keys.

In some arrangements, the second module may be arranged to store said received password, and to compare said received password to any previously stored received passwords whereby to validate the received password.

According to a second aspect of the present invention, there is provided a method of verifying, by a system, a request for access to data using a computing device that is configured to communicate with a first trusted indicator of time, the method comprising: generating at a first module a password using at least a second trusted indicator of time; receiving at a second module a password associated with the request for access to data, validating at the second module the received password using at least an untrusted indicator of time; and causing a message to be transmitted to the computing device, the message comprising data indicative of the untrusted indicator of time used to validate the received password; wherein, the system causes the computing device to generate data indicative of a comparison between the untrusted indicator of time and the first trusted indicator of time, wherein the generated data is for use in providing said access to data, and wherein the system comprises the first module and the second module.

Further features and advantages of the invention will become apparent from the following description of preferred embodiments of the invention, given by way of example only, which is made with reference to the accompanying drawings.

BRIEF DESCRIPTION OF THE DRAWINGS

FIG. 3 shows schematically a method according to one or more embodiments of the present invention.

DETAILED DESCRIPTION OF CERTAIN INVENTIVE EMBODIMENTS

Figure 1:
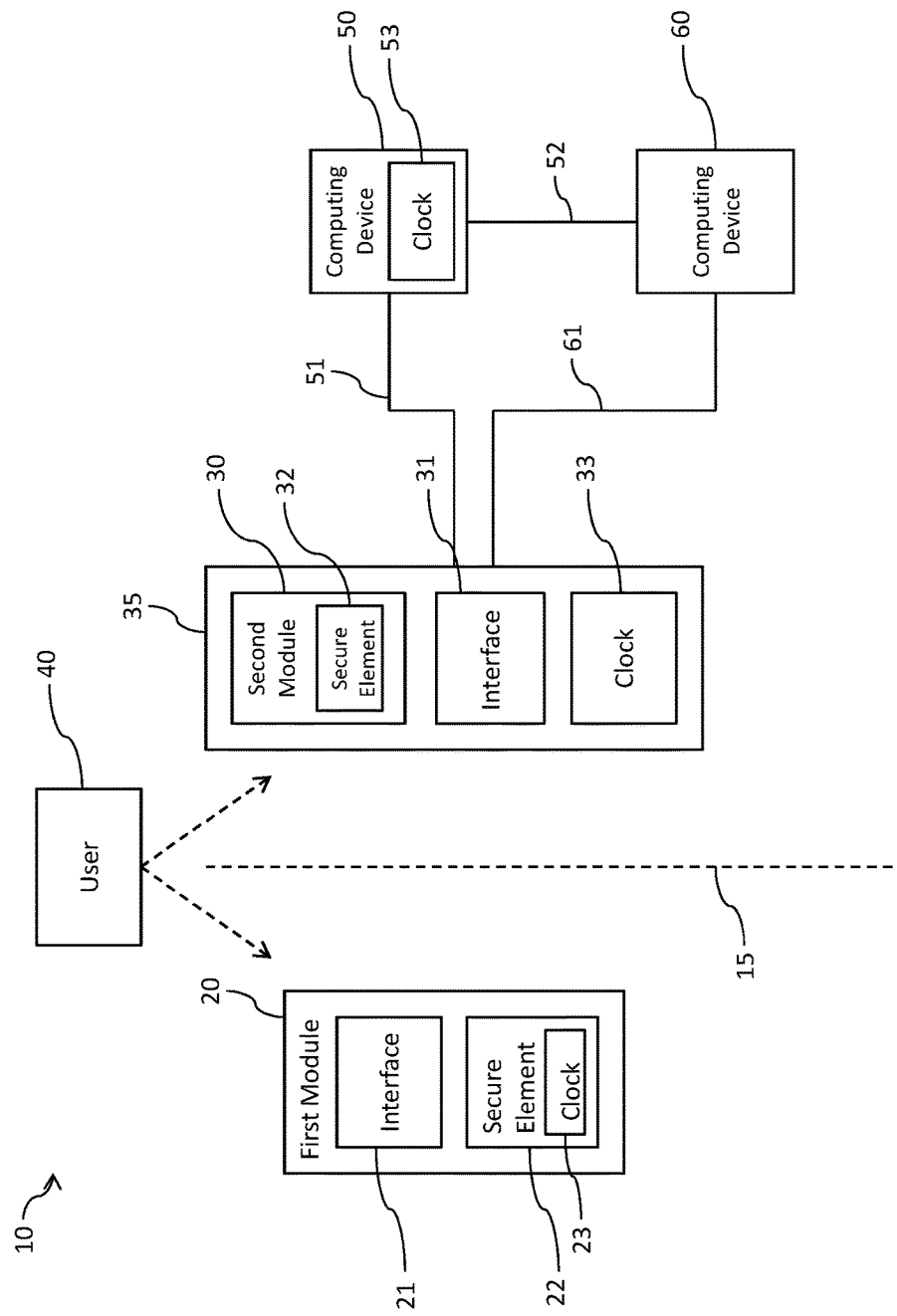
FIG. 1 shows a block diagram of a system according to one or more embodiments of the present invention.

Embodiments of the invention are concerned with determining whether to enable access to requested data, assets or services. FIG. 1 shows a block diagram of a system 10 according to an embodiment of the present invention. The system 10 comprises a first module 20 and a second module 30. The first module 20 is arranged to generate passwords, and the second module 30 is arranged to receive passwords from a user of the system 10 and validate the received passwords. As represented by dashed line 15, in the embodiment shown in FIG. 1, the first module 20 is communicatively disconnected from the second module 30. In other words, the system 10 is constructed and configured such that there are no means of communicating (except via a human user) between the two modules 20 and 30. In one particular embodiment, communication between the two modules 20 and 30 is prevented by the modules 20 and 30 being physically disconnected from each other. It will be understood however, that the two modules 20 and 30 could be physically connected (i.e. integrated) whilst being communicatively disconnected e.g. if they do not share any common circuitry or system interfaces or comprise any other means of exchanging information with each other.

In an alternative embodiment, the first and second modules 20, 30 may be communicatively connected.

The first module 20 comprises an interface 21, which may be a user interface. Interface 21 may comprise at least one input and/or output. An input of a user interface of a device may be, for example, a button, a keyboard, a number pad, a mouse, a touch screen, a microphone or any other component that allows the user to provide an input to the device. An output of a user interface of a device may be, for example, a screen, a speaker, a Braille coder, or any other component capable of outputting information from the device to a user of the interface 21.

The first module 20 may also comprise a secure element 22. As will be described in more detail below, in some embodiments, the secure element 22 may store a secret that is assigned to the first and second modules. The secure element 22 may also comprise a clock 23 which is capable of providing a trusted indicator of time (hereinafter referred to as the "second trusted indicator of time"). The secure element 22 may be tamper proof; that is the secure element 22 may be configured such that the second trusted indicator of time cannot be altered, and therefore the second trusted indicator of time is trusted. Equally the tamper proofing means that the stored secret may not be read, and therefore used, without the cooperation of the first module 20.

The second module 30 is shown as part of a device 35. The device 35 may comprise an interface 31, which may be a user interface, which may comprise any or all of the features described above with reference to interface 21. In addition, the device comprises a clock capable of providing an indication of time. The second module 30 is capable of communicating with the interface 31 and clock 33 of the device, and as such be able to communicate with a user, in particular to receive a password provided by the user, and be able to access an indication of time from the clock 33.

The second module 30 itself may contain a secure element 32. Like the secure element 22, the secure element 32 may, in some embodiments, store a secret assigned to the first and second modules. In some embodiments, the second module and/or the secure element 32 is removable from the device 35. As the clock 33 of the device 35 is not part of the secure element 32, the indicator of time provided by the clock 33 is untrusted, as it may be altered by a user, or other parties (e.g. a remote adversary).

The second module is communicatively connected to at least one further computing device or system, for example, one or both of computing devices 50 and 60. These computing devices may be servers, connected to the device 35 via a network. Alternatively the computing devices may be other forms of computer, such as a desktop computer, to which the device 35 is connected e.g. via connections 51 and 61. The computing devices may be distributed systems, i.e. cloud computing systems or similar. Computing devices 50 and 60 may be connected via connection 52. As will be described in more detail below, the computing device 50 also comprises a clock 53, which is able to provide a first trusted indicator of time. The second module 30 may be paired with the computing device 50. For example, the second module 30 may have been paired with the computing device 50 during a configuration process in which a cryptographic key is assigned to both the second module 30 and the computing device 50 for use in secure communications therebetween.

As stated above, in the present embodiment, the first and second modules are communicatively disconnected. Therefore, in use, the interface 21 of the first module 20 is configured to provide a generated password to a user, shown as block 40, and the interface 31 accessible by the second module 30 is configured to receive a password from the user 40.

In some embodiments, the first module 20 and the second module 30 may be separate devices that are collectively configured to determine whether it is likely that a request for access to data originated from a user in physical possession of the second module 30. As an example, the two modules 20 and 30 may be manufactured and sold together, and are in the possession of a particular person. The device 35 may, in one example, be a communications device, such as a mobile telephone or bank card reader. As such, the second module may be a SIM card, or banking card capable of being inserted into device 35. In alternative embodiments, the first and second modules 20 and 30 may be components of a single device.

The second module 30 may operate under the control of a user who is in possession of the second module 30 via the interface 31 of the device 35. However, the second module 30 may also operate under the control of a remote entity having a communications link to the second module 30. In the present embodiment, as the first module 20 is communicatively disconnected from the second module 30, described in more detail below, it cannot be controlled via the interface 31 of the second module 31, nor by a remote communications link.

The device 35 may store confidential data associated with a particular person. As a particular example, the second module 30 may store user-restricted cryptographic keys for decrypting data. Additionally or alternatively, the second module 30 may provide or facilitate access to confidential data that is stored externally by a third party, for example on one or both of computing devices 50 and 60. In this latter case, the third party may only allow access to the data if it is determined that the data is being provided to a particular person, i.e. the person in physical possession of the first and second modules 20 and 30 (in other words, the data may be user-restricted). Before a third party will grant access to user-restricted data via a particular device, the third party may require that the owner of a device registers an association between the device and the owner. In this case, the third party may then only send data, which is intended to be received by a particular person, to the device that is associated with that person. In further embodiments, the third party may take an action, such as accessing confidential information and/or payment data and sending the same to a fourth party, if the instructions to do so are received via the second module 30. For example, the computing device 50 may send confidential information to the computing device 60. As such, in the present example, the second module 30 may have a registered association with a particular person, and thus the second module 30 can be used to identify that it is the particular person, i.e. an account holder, that is making a request.

When the second module 30 comprises a communications module, it will be appreciated that an unauthorized person could make a connection to the second module 30 and remotely control the second module 30 to send a request to the third party. If the second module 30 can determine whether the request for access to data was made either by a user in possession of the second module 30 or by a user remote from the second module 30, it can take an appropriate responsive action e.g. disallow further use of the second module 30 upon a determination that the request was made by a remote user.

As will now be explained, embodiments provide a means of performing such a determination. The first module 20 comprises circuitry and/or software that is constructed and configured to generate a password based on the trusted indicator of time from clock 23 (i.e. the above-mentioned second trusted indicator of time). This circuitry and/or software may, at least in part, be contained within the secure element 23.

As described above, in one embodiment, the first and second modules 20, 30 may be configured with a shared secret for use in both generating and validating passwords. In this embodiment, the first module 20 may be arranged to generate a password based also on the shared secret. The secret may, in one embodiment, be uniquely assigned to the first and second modules 20, 30.

The secret that is assigned to the first and second modules 20 and 30 may be an OTP generation key and the password that is generated by the first module 20 is thus a one-time password (OTP). In this embodiment, subsequent passwords generated by the first module 20 are different from the previously generated passwords, and each generated password is valid for one authentication attempt only. In one particular arrangement, the generated OTP is time-dependent and is valid for a predetermined period of time. In an alternative arrangement, the first module 20 may generate a password in dependence upon a previously generated password and the second trusted indicator of time using an OTP generation key.

The OTP is generated by the first module 20 in dependence upon a second trusted indication of time provided by the clock 23 of the first module 20 and the OTP generation key (i.e. the secret). The OTP may be a cryptographic function of the OTP generation key and the current time. In the case that the first module 20 and the second module 30 are composite parts of a single device, the OTP may additionally be generated in dependence on a device ID uniquely associated with the device. Such a device ID may be, for example, a hashed function of the CPU ID, a hashed function of a GPU ID of the device, or a combination thereof. In this case, the OTP may be a cryptographic function of the OTP generation key, the device ID and the second trusted indicator of time. The value of the second trusted indicator of time will be known herein as the "generation time" TG, and it will be understood to have been measured with respect to the clock 23 of the first module 20. In this case, a particular generated OTP can only be used to validate a request for access to data if used within a predetermined period of the generation time TG. In such cases, the generated OTP may be validated if the time TRU is within a predetermined period of time preceding or following the generation time TG used to generate the password at the first module 20—here TRU may precede TG because of time drift between the two indicators of time.

It will be appreciated that, despite the name, there is a low but finite chance that an OTP may be reused. Nevertheless, the chance that a previously generated password will be valid at a later time is effectively the same as the chance of a random password working, and as such, for the purposes of this document, it will be assumed that a given password will only be valid once during the lifetime of the modules, and is therefore a OTP. In addition, should an OTP be used twice within the predetermined period of time for which it is valid, it will be rejected—this prevents re-use of passwords.

The second module 30 also comprises circuitry and/or software that is constructed and configured to determine, based on the untrusted indicator of time from clock 33 (and optionally also the shared secret, if the second module 30 is so configured), whether a password received from user 40 of the second module 30 matches the password that would have been generated by the first module 20 at the time as indicated by the untrusted indicator of time from clock 33. Again, at least a part of the circuitry and/or software may be contained within the secure element 32.

In the particular embodiment shown in FIG. 1, a secret is uniquely assigned to the first and second modules 20 and 30. In other words, the secret may be associated with the first and second modules 20 and 30 only. However this is not an essential requirement. In embodiments, the secure elements 22 and 32 of the first and second modules 20 and 30 are tamper-resistant, i.e. the secret and the algorithm used to generate the password stored within the secure element 23 and 33 cannot be altered.

As mentioned above, the password as generated by the first device 20 is generated using an appropriate algorithm and an indication of time, and is therefore a OTP. The indicator of time (i.e. the aforementioned second trusted indicator of time) may be, for example, an integer number, where the integer number increments at a predetermined frequency (such as every 30 seconds or every minute). The integer may have a zero value corresponding to a known point in time in the past, and may be arranged such that, over the lifetime of the device the integer does not roll over—that is it will not reach the maximum value of the register storing the integer, and thus return to zero. This ensures that the second trusted indicator of time has a unique value which is never repeated, and therefore any passwords generated using the second trusted indicator will not be repeated. The above notwithstanding, it will be apparent that any other trusted indicator of time may be used instead. The second trusted indicator of time may be generated by a clock contained within the secure element 23.

Figure 2:
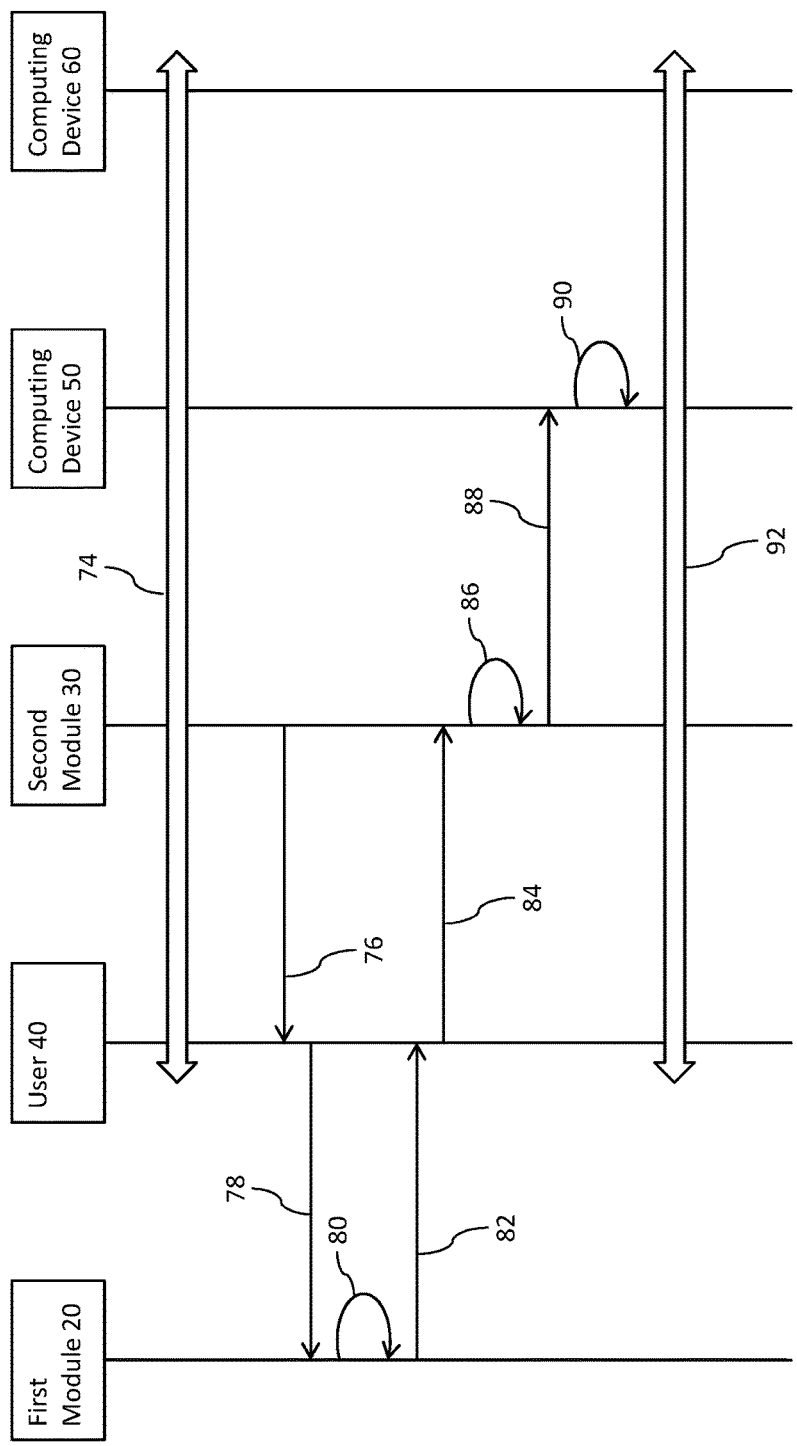
FIG. 2 shows schematically a method according to one or more embodiments of the present invention.

FIG. 2 shows schematically an exemplary method according to the present embodiment. In this method, the user 40 makes a request for access to data, as represented by arrow 74. The request for access to data may be, for example, a request for access to a restricted webpage, a request for access to confidential information, or a request for access to data for use in enabling access to a service. The request may be made on the device 35, and thus via the second module 30, alternatively the request may be made by the user to any of the computing devices 50 and 60. In general, the data that the user 40 wishes to access could be data stored on, or generated, by any component of the system 10, or could be data that is stored at or generated by an entity that is external to the system 10 (for example an external database or server). The data that the user 35 of the second module 30 wishes to access may be, for example, a restricted webpage hosted on a server, which is external to the system 10, and in this case, access to the webpage may be enabled by the server sending data to the second module 30. The information contained in the data sent by the second module 30 will be explained in more detail below.

In response to the request for access to data at step 74, the second module 30, in step 76, prompts the user 40 to enter a password that has been generated by the first module 20. The user, in step 78, may then cause the first module 20 to generate a password by, for example, pressing a button of the interface 21 of the first module or otherwise indicating to the first module 20 that a password is required.

In step 80, the first module 20 uses the secret that is uniquely assigned to the first and second modules 20 and 30, as well as the second trusted indication of time provided by clock 33, to generate a password, which is then provided in step 82 to the user 40. The generated password may be, for example, a series of numbers, a series of letters, a combination of letters, numbers and other characters or an image and may for example be presented to the user 40 on a screen of the interface 21.

Alternatively, the first module 20 may generate passwords (in dependence on the shared secret and the second trusted indicator of time) at regular time intervals and may automatically present the most recently generated password on the interface 21 of the first module 20. In such situations, step 78 would not be required as the first module 30 would present the password without request.

In either case, the user 40 may then provide, in step 84, the password generated by the first module 20 to the second module 30. This may be done by the user entering the password into the interface 31 of the device 35, via which it is provided to the second module 30. In step 86, the second module 30 then uses the secret that is uniquely assigned to the first and second modules 20 and 30, and the untrusted indicator of time from the clock 33 of the device 35, to verify whether the password received from the user 40 is the same as the password that would have been generated by the first module 20.

It will be appreciated that when a password that is generated by the first module 20 is entered into the second module 30, the password must have been previously retrieved from the first module 20. As, in this embodiment, the first module 20 is communicatively disconnected from the second module 30, it is highly likely that user 40 is a human who is in possession of, or at least has access to, the first module 20 as well as the second module 30, and is therefore able to retrieve the password from the first module 20 and provide it manually to the second module 30.

As stated above, the first module 20 and the second module 30 may each comprise a respective secure element 22 and 32 in which a secret is stored. The secret may be uniquely assigned to the first and second modules 20 and 30 and stored in the secure elements 22 and 32. In other words, the secret that is uniquely assigned to the first and second modules 20 and 30 is stored in parts of the first and second modules 20 and 30 that cannot be accessed by a user, such as user 40, and equally any other party which may gain access to the first and second modules 20 and 30.

In this case, the secret may be provisioned to the secure elements 22 and 32 of the first and second modules 20 and 30 at manufacture. In one embodiment, the secure elements 22 and 32 are manufactured separately to the other components of the modules 20 and 30 and thus the association between the modules 20 and 30 and the secret stored on the secure elements 22 and 32 cannot be known by any entity external to the system 10. Storing the secret within secure elements 22 and 32 prevents any user with access to either of the modules 20 and 30 from finding out the secret and thereby being able to work out the password that needs to be entered into the second module 30 in order to access the requested data. It also prevents any user from altering the algorithm for generating passwords, which could thereby cause the first module 20 or the second module 30 to generate a false response. For example, the algorithm on the second module may be altered to accept any input as valid.

One particular advantage of the present embodiment arises from the fact that the secret for generating and validating the password is uniquely assigned to the first and second modules 20 and 30. More specifically, because there is a one-to-one mapping between the secret and the module 30 that uses the secret to validate the password, and also a one-to-one mapping between the secret and the module 20 that uses the secret to generate the password, then in the event that the secret is compromised, the modules 20 and 30 need only to be reconfigured with a new secret (that is again uniquely assigned to the modules 20 and 30). This can be achieved, for example, by replacing the secure elements 22 and 32 of the modules 20 and 30 with new secure elements that have the new secret stored thereon. Alternatively, where the modules are relatively low cost items, such as a telephone SIM (second module 30) and an associated password generator module (first module 20), both modules may be replaced.

This may be contrasted to the known OTP system described in the background section, in which a given OTP key is uniquely associated to a particular user rather than to a pair of modules 20 and 30. In this known system, there can be a one-to-many relationship between the OTP key and the devices that use the OTP key to generate a password. That being the case, if an OTP key is compromised, data can be accessed on behalf of that user via any device that uses the OTP key. As the OTP key will typically be stored both on a number of OTP tokens and also at the authentication server, establishing a new OTP key can be quite burdensome on the authentication server, as the authentication server is required both to reassign a new OTP generation key to that user and to configure a new set of OTP tokens with the new OTP generation key.

The second module 30 uses the untrusted indicator of time from the clock 33 and the OTP generation key (i.e. the shared secret) to determine whether the password is the same as a password that would have been generated by the first module 20 at a time within a predetermined time from the time at which the password was received by the second module 30. The value of the untrusted indicator of time at which the password was received by the second module 30 will be known herein as the "untrusted reception time" TRU.

The method used by the second module 30 to validate the received password will depend on the method used by the first module 20 to generate the password. Many such methods are already known and the specific method is considered to be outside the scope of the present invention.

If the second module 30 determines that the received password matches an OTP that was/would have been generated by the first module 20 at a time TG that is within a predetermined period of the reception time TRU, then the second module 30 validates the received password.

However, this password may have been generated by the first module 20 at an earlier time, and replayed to the second module 30. This may occur if the device 35 has been compromised, and therefore the password entered via the interface 31 may be intercepted. As mentioned above, the password is a one-time-password (OTP) has been generated using an indication of time. Therefore, the time delay between the password being generated by the first module 20 and being received by the second module 30 would typically be sufficiently long for the OTP to no longer be valid.

Nevertheless, the second module 30 only has access to an untrusted indicator of time. This is typically because the indicator of time is provided by the clock 33 of the device 35. As such, the clock may have been adjusted, by for example, tampering with the device 35, through remote access of the device, or quite legitimately by simply setting the clock 33 through a user preference. This means that the untrusted indicator of time could be adjusted to correspond to the time at which the password was generated by the first module 20 and therefore to a time that corresponds to a password that was earlier intercepted by an adversary. This in turn may cause the second module to incorrectly determine the replayed password to be valid.

The second module 30 may only have access to an untrusted time, because it is impractical to provide the second module 30, or the secure element 32 thereof, with a secure, and therefore trusted, time. For example, where the secure element is a SIM or bank card, power may be removed from the second module 30, and as such any clock running on the module may lose the time. This makes the second module 30 reliant on the clock 33 of the device 35, which as stated above is untrusted.

As such, once the second module 30 has validated a received password using the untrusted indicator of time TRU, the second module 30 sends a message in step 88 to the computing device 50. This message contains data indicative of the indicator of time used to validate the received password (i.e. the untrusted timestamp TRU). The message may also contain data indicative of the validation of the received password (using the untrusted time) by the second module 30.

As mentioned above, the computing device 50 has access to a first trusted indicator of time, e.g. via clock 53. This clock 53 may be synchronized with the clock 23 of the first module 20. Here, being synchronized means that it is possible for the computing device 50 to access an indicator of time (T'G) which is within a predetermined range (to allow for drift between the clocks) from time TG used by the first module 20 to generate the password. Moreover, trust may have been established between the computing device 50 and the second module 30 by the sharing of cryptographic keys for use in signing and thereby authenticating messages sent therebetween, as will be discussed in more detail below.

Upon receiving the message containing the untrusted indicator of time, the computing device 50 compares the untrusted indicator of time TRU indicated in the received message to the first trusted indicator of time T'G as determined by the clock 53 of the computing device 50. If the untrusted time TRU is determined to be within the predetermined range of the first trusted time T'G and the message indicates that the password received by the second module 30 is valid, the computing device 50 determines to trust that the user 40 has access to both the first and second modules 20 and 30. Consequently, the computing device 50 may generate data indicative of this comparison, and use the generated data to provide access to data, as initially requested in step 74.

This is because, if the second module 30 has positively validated a received password using the timestamp TRU, then the user 40 must have provided a password that would have been generated by the first module 20 at a trusted time TG that is close to TRU. It follows then that, if TRU is close to the trusted time T'G as determined by the computing device 50, then TG must also be close to the current time and thus it can be determined that the user 40 must have provided a password that was/would have been generated by the first module 20 at some time TG close to, i.e. within a predetermined range of, the current time as indicated by T'G. Therefore, the user 40 is likely to be currently in possession of, or at least have access to, the first module 20. As there is no way to automatically transfer a password generated by the first module 20 to the second module 30, it is very likely that the person in possession of the second module 20 is also in possession of the first module 30 and can thereby transfer the password generated by the first module 20 to the second module 30 manually.

Advantageously, if the computing device 50 determines that the untrusted timestamp TRU is not within the predetermined range of the trusted time T'G, and therefore was obtained from a time source that is not synchronized with the clock of the first module 20, the computing device 50 may deny access to data.

Consequently, as shown by step 92, the computing device 50 may communicate with the other elements of the system to effect access to the data, thereby using the data generated by the comparison above. For example, the computing device 50 may send a message to the second module 30 which indicates whether the time TR is within the predetermined time range. If the time TR is within the predetermined time range, the second module 30 may enable access to requested data. Alternatively, if the time TR is outside the predetermined time range, the second module may deny access to the requested data.

The user 40 may have requested access to data that is held externally by the computing device 50. In this case, the computing device 50 may respond either by sending the requested data to the second module 30 or denying access. Alternatively, in a further example, the computing device 50 may enable access, by the computing device 60, to data stored on either or both of the computing device 50 or the second module 30. In a yet further example, the successful validation may be used to enable the computing device 50, and/or the second module 30, to access data on the computing device 60.

In the above examples, the second module 30 may store previously received OTPs and may invalidate any OTPs that have been previously received. This is particularly useful for situations in which the second module 30 is simultaneously accessed both by a remote adversary and a user in possession of both the first and second modules 20 and 30 (i.e. a local user 40). Assuming the remote user attempts to access data by replicating an OTP that was previously entered into the second module 30 by the local user 40, the second module 30 will reject the replicated OTP as a duplicate. In one arrangement, the second module 30 may store a limited number of previously received OTPs so as to be able to reject duplicates. The number of stored duplicates may be such that if a particular OTP, which is no-longer stored by the second module 30, is replicated, the third party 100 is likely to reject that OTP because it will be associated with a timestamp that is outside the predetermined range of the current time.

The message containing the untrusted timestamp TRU used by the second module 30 to validate a received password may be signed by the second module 30 (e.g. using a cryptographic key(s) associated with the second module 30 and the computing device 50), thereby allowing the computing device 50 to verify the origin of the message. This means that, if the remote user attempts to alter a message sent by the second module 30 containing the untrusted time, the computing device 50 will recognize that the message has been altered because it will not contain the second module's correct signature, and will deny access to the associated requested data. Equally, replayed messages, i.e. messages previously sent by the second module 30 which are resent to the computing device 50 will contain an untrusted indicator of time TRU that is in the past, and will therefore be rejected.

Further, if the computing device 50 is configured to send a message to the second module 30 indicating whether a received timestamp is valid, that message may also be signed. This allows the second module 30 to identify messages sent to the second module 30 by a party other than the computing device 50, which may not be trusted.

The above may be contrasted with a system in which the second module 30 retrieves a timestamp from a third party. In such a system it is possible that a remote user may observe an OTP entered by a user 40 in possession of both the first and second modules 20 and 30 and may also observe the timestamp received from the third party. That remote user may, at some time later, supply the second module 30 with the observed timestamp and the observed OTP. In this case the second module 30 may validate the remote user's password. However, in a system configured in accordance with the above embodiment, the second module 30 sends the timestamp used to validate the password to the computing device 50, the computing device 50 is able to identify that any timestamp is out-of-date and will deny access to the requested data accordingly.

A system configured in accordance with the above embodiment has the advantage that the second module is able to take the first step in verification of the provided password without having to access a remote timestamp. This speeds up time to verification as only a single message (step 88) may need to be transmitted for the system as a whole to complete verification. By contrast, a system in which a trusted timestamp is provided to the second module 30 requires at least two messages, a request for trusted time and a response.

FIG. 3 shows schematically an exemplary method for sharing temporary cryptographic keys, as a way of providing access to data, between a banking service provider, which may be computing device 50, and the second module 30. In this example, the banking service provider 50 has shared temporary cryptographic keys with another service provider, which may be associated with computing device 60. Together the cryptographic keys shared with the service provider 60 and the cryptographic keys shared with the second module 30 may be used in authenticating and/or encrypting/decrypting messages sent between the second module 30 and the service provider 60, as will be discussed in more detail below.

The second module 30 and the banking service provider 50 already have pre-assigned cryptographic keys for use in encrypting and authenticating messages sent therebetween, as discussed above. Further, the banking service provider 50 may store an association between the second module 30 and a particular bank account holder.

As described above, the second module 30 does not have a clock that is synchronized with the clock of the first module 20. However, the banking service provider 50 has a clock that is synchronized with the clock of the first module 20 (e.g. both clocks may run on universal time, or the banking service provider 50 may be able to derive the timestamp on the first module 20).

In this particular example, a user 40 requests, in step 96, a temporary cryptographic key from the banking service provider 50 via the second module 30 and device 35. When requesting access to the temporary cryptographic key, the user 40 may provide information to the second module 30 and/or device 35 that identifies the particular bank account holder in respect of which the user 40 wants to obtain a temporary cryptographic key.

Upon receiving the request for a temporary cryptographic key, i.e. the request for data, the second module 30 sends a message (step 98) to the banking service provider 50 indicating that a request for access to a temporary cryptographic key has been made by a user 40 and indicating that modules 20 and 30 are available for generating and validating passwords. This message (sent at step 98) informs the banking service provider 50 that it will be able to determine whether the request (at step 98) for access to a temporary cryptographic key originated from a user in physical possession of the first and second modules 20 and 30.

Accordingly, as shown by step 74', the banking service provider 50 may request that the second module provide an indication that the correct password has been provided. In this embodiment, the method generally proceeds as described above with reference to steps 76 to 88, with a password being requested from the first module, and validated by the second module.

However, in addition, a challenge code may be used to provide further security. The challenge code may be generated by the second module 30, or may be received by the second module 30 from the banking service provider 50 in step 74'. The challenge code is provided to the user 40 in step 76, and provided to the first module 30 by the user 40 in step 78. The challenge code is used by the first module 20 in the generation of the password in step 80, and subsequently in the validation of the password by the second module in step 86.

In an additional step (not referenced) the user 40 may be required to enter credentials (such as a username and a PIN or password) that have been pre-agreed between the banking service provider 50 and the bank account holder (i.e. user 40). This has the advantage that the banking service provider 50 is able to verify whether the user 40 of the second module 30 is the identified bank account holder or whether the user is a different person (who may have stolen the modules 20 and 30, for example).

As described above, the second module 30 determines in step 86 whether the password received from the user 40 is valid based on the untrusted indication of time available to the second module 30 and, if appropriate, any challenge code which may have been provided. Subsequently, in step 88 second module 30 sends a message providing the untrusted indication of time used to verify that received OTP. The message may additionally contain data indicative that the received OTP was found to be valid, and that the correct challenge code was used to generate the password. The response may be encrypted and/or signed, for example by using the cryptographic keys shared between the second module 30 and the computing device 50. The response may also contain any username, password and the like provided by the user 40.

If, on the other hand, the second module 30 does not successfully validate the received password, the second module 30 may send a signed message to the banking service provider 50 indicating that the received OTP was found to be invalid.

If the message sent at step 88 indicates that the received OTP was validated then the banking service provide 50 may compare the time indicated in the untrusted timestamp sent at step 88 with the first trusted indicator of time. This step may include any other form of authentication, for example validating a username and password as described above. If the banking service provider 50 determines that the untrusted time (provided in step 88) is within predetermined time interval and, if required, that any other authentication credentials (i.e. username and password) are valid, the banking service provider 50 may send (in step 100) the requested temporary cryptographic key to the second module 30, where it is then stored.

In an alternative example, rather than the banking service provider 50 generating and distributing the temporary cryptographic key, the temporary cryptographic key could be generated by the service provider 60, and sent to the banking service provider 50, which will then determine whether to share that key with the second module 30 as in the case where the temporary cryptographic key is generated by the banking service provider 50. Alternatively, the temporary cryptographic key could be generated by the second module 30, and may be sent to the banking service provider 50 in the message 88 for example. In this arrangement, the banking service provider 50 may then share that temporary cryptographic key with a service provider 60.

As mentioned above, the second module 30 is registered with a banking service provider 50 as being owned by a particular bank account holder. The banking service provider 50 shares temporary cryptographic keys with the second module 30 and the service provider 60. The service provider 60 may already know the bank account holder is the registered owner of the second module 30, and in this case, when the temporary cryptographic keys are shared with the service provider 60, the bank account holder that is associated with those keys is identified to the service provider 60. Alternatively, if the bank account holder is not already known by the service provider 60, the banking service provider 50 may send to the service provider 60 information for use in identifying and providing a service to that bank account holder when the associated temporary cryptographic keys are shared.

In the present example, a user 40 may request (step 102) access to a further service provider 60 for use in making a payment or transferring funds from the account of the bank account holder In some embodiments, rather than a request for access to data being received at any of the second module 30, computing device 50 or computing device 60 from a user 40, a request for access to data may be generated by any of the second module 30, computing device 50 or computing device 60 without user input. For example, a third party operating computing device 50 may wish to determine whether there is a user 40 of the second module 30 who is in physical possession of the second module 30 and thus the computing device 50 sends a message to the second module 30 indicating same. Upon receipt of this message, the second module 30 prompts a user 40 of the second module 30 to enter a password that has been generated by the first module 20 into the second module 30, and the method proceeds as described above.

Embodiments of the invention may be contrasted with a system in which the secret used by the first module 20 to generate a password is not known by the second module 30, but is instead shared between an authentication server, such as computing device 50, and the first module 20. While the second module 30 in such embodiment is not required to have access to an indication of time, whether trusted or untrusted, the system may lose the security of having the secret uniquely shared between the first and second module, as the secret is then shared between the first module 20 and the computing device 50. Indeed, should the computing device 50 be compromised, many secrets may become known, in contrast to the system above, in which only a single secret can become known through a first or second module becoming compromised.

As set out above, the first and second modules 20 and 30 may be composite parts of the same device and may be communicatively disconnected from each other within that device. In these embodiments, the only (realistically likely) way a user 40 is able to retrieve a password from the first module 20 and enter it into the second module 30 is if the user 40 is in possession of the first module 20. It follows therefore that in this case, the user 40 is very likely to be in possession of the device and is therefore a human user. Thus, if the second module 30 validates the password received from the user 40, the second module 30 can determine up to a very high level of confidence that the request for access to data originated from a human who is in possession of the device (and is therefore not a remote entity). Enabling access to the requested data may include allowing access to restricted data held on the device or, in the case that the requested data is held by a third party (such as computing device 50), it may include sending data to the third party for use in enabling access to the requested data.

It will be appreciated that the user 40 as described above may not be a single physical person, and as such a first user may provide the password to a second user, from whom the password is received by the interface 31.

The interface 21 of the first module 20 and the interface 31 of the device 35 may be user interfaces as described above. However in some embodiments, the interfaces may provide an input/output interface connecting to a suitable user interface. This may be done to enable the first module 30 or the device 35 to be distributed, such that the user interfaces via which the password is provided may be physically separated.

The above embodiments are to be understood as illustrative examples of the invention. Further embodiments of the invention are envisaged. For example, the second module 30 may be for use in enabling access to data, assets or services held or supplied by a plurality of third parties for example computing devices 50 and 60 and other systems not shown. It will be appreciated that, while in many of the embodiments described above, the first and second modules have been described as being communicatively connected, this feature is not an essential feature of the invention, and in other embodiments, the first and second modules 20, 30 might be communicatively connected. Similarly, while advantageous, the first and second modules 20, 30 are not required to share a secret for use in generating and validating passwords. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The following numbered clauses set out preferred embodiments of the present invention:

1. A system for use in verifying a request for access to data, the system having access to a computing device that is configured to communicate with a first trusted indicator of time, the system comprising: a first module having access to a second trusted indicator of time; and a second module having access to an untrusted indicator of time, wherein: the first module is arranged to generate a password using at least the second trusted indicator of time; the second module is arranged to: receive a password associated with the request for access to data, validate the received password using at least the untrusted indicator of time, and cause a message to be transmitted to the computing device, the message comprising data indicative of the untrusted indicator of time used to validate the received password; and the system is arranged to cause the computing device to: generate data indicative of a comparison between the untrusted indicator of time and the first trusted indicator of time, and selectively provision the system with said access to data on the basis of the generated data.

2. A system according to clause 1, wherein the message transmitted to the computing device comprises data indicative of the validation of the received password using at least the untrusted indicator of time by the second module 3. A system according to clause 1 or clause 2, wherein the first and second modules share a secret that has been uniquely assigned thereto, the first module being arranged to use the secret to generate the password, and the second module being arranged to use the secret to validate the received password.

4. A system according to clause 3, wherein the secret is stored in a secure element of the first module.

5. A system according to any of clauses 1 to 4, wherein the secret is stored in a secure element of the second module.

6. A system according to any of clauses 1 to 5, wherein the first module comprises tamper resistant hardware comprising a clock, the clock being arranged to provide the second trusted indicator of time.

7. A system according to any of clauses 1 to 6, wherein the second module is communicatively connected to a device having a clock, the clock being arranged to provide the untrusted indicator of time.

8. A system according to any of clauses 1 to 7, wherein the computing device is arranged to send a message comprising the generated data to a further computing device whereby to provision the system with said access to data, the further computing device being arranged to provide said access to data upon receipt of the generated data.

9. A system according to any of clauses 1 to 7, wherein said requested data is stored at or generated by the computing device, and the computing device is arranged to provide said access to data based on the generated data.

10. A system according to any of clauses 1 to 9, wherein the first module is arranged to receive, via an interface of the first module, a challenge code generated by the second module or the computing device, and to generate the password using at least the challenge code.

11. A system according to any of clauses 1 to 10, wherein the first module is arranged to generate a plurality of passwords, at least one password of the plurality of passwords being different from another password of the plurality of passwords, and to provide at least one of the generated passwords to a user via an interface of the first module.

12. A system according to any of any of clauses 1 to 11, wherein the second module and the computing device share a further secret for use in communications therebetween.

13. A system according to any of clauses 1 to 12, wherein the second module is arranged to store said received password, and to compare said received password to any previously stored received passwords whereby to validate the received password.

14. A system for use in verifying a request for access to data, the system comprising: a first module having access to a trusted indicator of time; and a second module having access to an untrusted indicator of time, wherein: the first module is arranged to generate a password using at least the trusted indicator of time; the second module is arranged to: receive a password associated with the request for access to data, validate the received password using at least the untrusted indicator of time, and cause a message to be transmitted to a computing device, the message comprising data indicative of the untrusted indicator of time used to validate the received password; and receive data indicative of a comparison between the untrusted indicator of time and a further trusted indicator of time from the computing device, and use the received data to provide said access to data, wherein the first module and the second module are communicatively disconnected.

15. A system according to clause 14, wherein said data received from the computing device comprises data indicating whether the untrusted indicator of time is within a predetermined range of the first trusted indicator of time.

16. A system according to clause 14 or clause 15, wherein said requested data is held by the second module, and the second module is configured to use said data received from the computing device to determine whether to provide access to said requested data.

17. A system according to any of clauses 14 to 16, wherein said trusted indicator of time to which the first module has access is a clock of the first module, and the further trusted indicator of time to which the computing device has access is a clock that is synchronized with the clock of the first module.

18. A system according to any of clauses 14 to 17, wherein the computing device and the second module are preconfigured with cryptographic keys for use in signing data sent therebetween, and wherein the second module is arranged to sign said message transmitted to the computing device and to verify that said data received from the computing device is signed by the computing device using said cryptographic keys.

19. A system according to any of clauses 14 to 18, wherein the second module is arranged to store said received password, and to compare said received password to any previously stored received passwords whereby to validate the received password.

What is claimed is:

1. A system for use in verifying a request for access to data, the system comprising:
   a computing device that is configured to communicate with a first trusted indicator of time that is trusted for time verification;
   a first device comprising a first circuit having tamper resistant hardware comprising a clock, the clock being arranged to provide a second trusted indicator of time that is trusted for password generation; and a second device comprising a second circuit having access to an untrusted indicator of time that is untrusted for password validation, wherein:
the first circuit is arranged to generate a password using at least the second trusted indicator of time;
the second circuit is arranged to:
receive a password associated with the request for access to data, validate the received password using at least the untrusted indicator of time; and
cause a message to be transmitted to the computing device, the message comprising data indicative of the untrusted indicator of time used to validate the received password, and
the system is arranged to cause the computing device to generate data indicative of a comparison between the untrusted indicator of time and the first trusted indicator of time, wherein the generated data is for use in providing said access to data.

2. A system according to claim 1, wherein the system is arranged to cause the computing device to selectively provision the system with said access to data on the basis of said generated data.

3. A system according to claim 1, wherein the message transmitted to the computing device comprises data indicative of the validation of the received password using at least the untrusted indicator of time by the second circuit.

4. A system according to claim 1, wherein the first and second circuits share a secret that has been uniquely assigned thereto, the first circuit being arranged to use the secret to generate the password, and the second circuit being arranged to use the secret to validate the received password.

5. A system according to claim 4, wherein the secret is stored in a secure element of the first circuit.

6. A system according to claim 4, wherein the secret is stored in a secure element of the second circuit.

7. A system according to claim 1, wherein the second circuit is communicatively connected to a device having a clock, the clock being arranged to provide the untrusted indicator of time.

8. A system according to claim 1, wherein the system is arranged to cause the computing device to send a message comprising the generated data to a further computing device whereby to provision the system with said access to data, the further computing device being arranged to provide said access to data upon receipt of the generated data.

9. A system according to claim 2, wherein said requested data is stored at or generated by the computing device, and the computing device is arranged to provide said access to data based on the generated data.

10. A system according to claim 1, wherein the first circuit is arranged to receive, via an interface of the first circuit, a challenge code generated by the second circuit or the computing device, and to generate the password using at least the challenge code.

11. A system according to claim 1, wherein the first circuit is arranged to generate a plurality of passwords, at least one password of the plurality of passwords being different from another password of the plurality of passwords, and to provide at least one of the generated passwords to a user via an interface of the first circuit.

12. A system according to claim 1, wherein the second circuit and the computing device share a further secret for use in communications therebetween.

13. A system according to claim 1, wherein the second circuit is arranged to store said received password, and to compare said received password to any previously stored received passwords whereby to validate the received password.

14. A system according to claim 1, wherein the first and second circuits are communicatively disconnected, and the second circuit is arranged to receive said generated data from the computing device and use said received data to provide said access to data.

15. A system according to claim 14, wherein said data received from the computing device comprises data indicating whether the untrusted indicator of time is within a predetermined range of the first trusted indicator of time.

16. A system according to claim 14, wherein said requested data is held by the second circuit, and the second circuit is configured to use said data received from the computing device to determine whether to provide access to said requested data.

17. A system according to claim 14, wherein the second trusted indicator of time is a clock of the first circuit, and the first trusted indicator of time is a clock that is synchronised with the clock of the first circuit.

18. A system according to claim 14, wherein the computing device and the second circuit are preconfigured with cryptographic keys for use in signing data sent therebetween, and wherein the second circuit is arranged to sign said message transmitted to the computing device and to verify that said data received from the computing device is signed by the computing device using said cryptographic keys.

19. A system according to claim 14, wherein the second circuit is arranged to store said received password, and to compare said received password to any previously stored received passwords whereby to validate the received password.

20. A method of verifying, by a system, a request for access to data using a computing device that is configured to communicate with a first trusted indicator of time that is trusted for time verification, the method comprising:
generating at a first circuit of a first device a password using at least a second trusted indicator of time that is trusted for password generation, the second trusted indicator of time being provided by tamper resistant hardware comprising a clock;
receiving at a second circuit of a second device a password associated with the request for access to data,
validating at the second circuit the received password using at least an untrusted indicator of time that is untrusted for password validation; and
transmitting a message to the computing device, the message comprising data indicative of the untrusted indicator of time used to validate the received password; wherein,
the computing device generates data indicative of a comparison between the untrusted indicator of time and the first trusted indicator of time, wherein the generated data is for use in providing said access to data, and
wherein the system comprises the first circuit and the second circuit.

21. A system for use in verifying a request for access to data, the system comprising:
a computing device that is configured to communicate with a first trusted indicator of time that is trusted for time verification;
a device comprising a first circuit and a second circuit, the first circuit having tamper resistant hardware comprising a clock, the clock being arranged to provide a second trusted indicator of time that is trusted for password generation, and the second circuit having access to an untrusted indicator of time that is untrusted for password validation, wherein:

the first circuit is arranged to generate a password using at least the second trusted indicator of time;

the second circuit is arranged to:

receive a password associated with the request for access to data, validate the received password using at least the untrusted indicator of time; and cause a message to be transmitted to the computing device, the message comprising data indicative of the untrusted indicator of time used to validate the received password, and the system is arranged to cause the computing device to generate data indicative of a comparison between the untrusted indicator of time and the first trusted indicator of time, wherein the generated data is for use in providing said access to data.

\* \* \* \* \*